(12) United States Patent
Kachlany et al.

(10) Patent No.: US 11,540,460 B2
(45) Date of Patent: Jan. 3, 2023

(54) APPARATUS FOR APPLYING A LIQUID AND METHOD OF USE

(71) Applicant: Gardinnovations, LLC, Bridgewater, NJ (US)

(72) Inventors: Scott Kachlany, Bridgewater, NJ (US); Teri Chu, Sacramento, CA (US)

(73) Assignee: Gardinnovations, Bridgewater, NJ (US)

( * ) Notice: Subject to any disclaimer, the term of this patent is extended or adjusted under 35 U.S.C. 154(b) by 763 days.

(21) Appl. No.: 16/524,320

(22) Filed: Jul. 29, 2019

(65) Prior Publication Data

US 2020/0037523 A1 Feb. 6, 2020

Related U.S. Application Data

(60) Provisional application No. 62/713,213, filed on Aug. 1, 2018.

(51) Int. Cl.
| | |
|---|---|
| *A01G 29/00* | (2006.01) |
| *A01C 23/02* | (2006.01) |
| *B05B 1/16* | (2006.01) |
| *A01M 7/00* | (2006.01) |
| *A01G 25/00* | (2006.01) |
| *A01G 25/14* | (2006.01) |

(52) U.S. Cl.
CPC ............ *A01G 29/00* (2013.01); *A01C 23/027* (2013.01); *A01G 25/14* (2013.01); *A01M 7/0046* (2013.01); *B05B 1/16* (2013.01)

(58) Field of Classification Search
CPC ...... A01G 29/00; A01G 25/14; A01C 23/027; A01M 7/0046; B05B 1/16; B05B 15/622
See application file for complete search history.

(56) References Cited

U.S. PATENT DOCUMENTS

| | | | | |
|---|---|---|---|---|
| 1,624,033 A | * | 4/1927 | Barnard ............... | A01M 21/043 111/7.2 |
| 2,993,650 A | * | 7/1961 | Badberg .................... | B05B 1/14 239/443 |
| 3,613,310 A | * | 10/1971 | Rynberk ................. | G01F 23/04 73/290 R |
| 3,820,716 A | * | 6/1974 | Bauer ................... | B05B 7/0425 137/829 |
| 5,050,340 A | * | 9/1991 | Seifert ................. | A01C 23/026 239/271 |
| 5,279,073 A | * | 1/1994 | Czebieniak ............ | A01G 29/00 47/58.1 R |
| 5,671,887 A | * | 9/1997 | Iavarone ............... | B05B 7/2445 111/7.1 |
| 5,694,716 A | * | 12/1997 | Bible ..................... | A01G 29/00 175/23 |

(Continued)

*Primary Examiner* — Joseph A Greenlund
(74) *Attorney, Agent, or Firm* — Wood, Phillips, Katz, Clark & Mortimer

(57) ABSTRACT

An apparatus for applying a liquid to a plant growing in soil includes a handheld assembly having a spray configuration for applying a liquid to a plant as a spray at a location above the surface of the soil in which the plant is growing, and a probe configuration for applying a liquid below the surface of the soil proximate to the roots of the plant. The assembly is selectively reconfigurable by a user between the first spray configuration and the second probe configuration.

11 Claims, 13 Drawing Sheets

(56) References Cited

U.S. PATENT DOCUMENTS

| | | | | |
|---|---|---|---|---|
| 5,727,484 | A * | 3/1998 | Childs | A01C 23/026 239/271 |
| 5,975,432 | A * | 11/1999 | Han | B05B 1/3013 239/526 |
| 6,220,525 | B1 * | 4/2001 | McSherdon | A01M 17/002 43/132.1 |
| 7,165,357 | B2 * | 1/2007 | Burgess | A01G 7/06 47/57.5 |
| 7,178,286 | B1 * | 2/2007 | Doolittle | A01G 7/06 47/57.5 |
| 8,132,362 | B2 * | 3/2012 | King | A01G 29/00 405/45 |
| 8,413,373 | B2 * | 4/2013 | Vered | A01G 22/05 47/58.1 R |
| 8,671,614 | B1 * | 3/2014 | Doolittle | A01G 7/06 47/57.5 |
| 8,746,767 | B2 * | 6/2014 | Mouch | B25G 3/12 294/51 |
| 9,949,449 | B2 * | 4/2018 | Ryan | A01G 29/00 |
| 10,667,468 | B1 * | 6/2020 | Tang | A01G 9/249 |
| 2005/0166450 | A1 * | 8/2005 | Wild | A01G 7/06 47/57.5 |
| 2014/0216311 | A1 * | 8/2014 | De Lany | A01C 23/026 111/118 |
| 2015/0217320 | A1 * | 8/2015 | Bonzer | A01G 25/14 239/587.4 |
| 2016/0236224 | A1 * | 8/2016 | Gopalarao | B05B 12/002 |
| 2017/0021486 | A1 * | 1/2017 | Reissmann | B25G 3/26 |
| 2017/0347542 | A1 * | 12/2017 | Ryan | B05B 1/14 |
| 2020/0037523 | A1 * | 2/2020 | Kachlany | B05B 1/16 |
| 2020/0307885 | A1 * | 10/2020 | Mazzola | B05B 11/047 |

* cited by examiner

APPARATUS FOR APPLYING A LIQUID AND METHOD OF USE

FIELD OF THE INVENTION

The present invention relates generally to an apparatus for applying a liquid to a plant and a method of use, and more particularly to an apparatus having a spray configuration and a probe configuration to facilitate the application of the liquid to the plant.

BACKGROUND OF THE INVENTION

Plants and trees absorb water and nutrients through their roots, which can extend deep below the surface of the soil. However, the inventors have found that a substantial portion of liquid (e.g., water, fertilizer, etc.) that is sprayed onto plants and trees from a traditional hose nozzle is lost due to evaporation, lateral diffusion, and/or absorption by surrounding weeds that have relatively shallow roots.

Thus, most of the water from a traditional hose nozzle never reaches the roots of the target plant, and is instead wasted. There remains a need for an improved apparatus for effectively applying a liquid, such as water, to a target plant or tree to reduce waste and/or avoid assisting in the growth of undesirable plants such as weeds.

There further remains a need for providing such an improved apparatus in a manner that is amenable to mass-production at a reasonable cost.

SUMMARY OF THE INVENTION

In accordance with the present invention, an apparatus for applying a liquid to a plant includes a handheld assembly having: (i) a spray configuration for applying a liquid to a plant as a spray at a location above the surface of the soil in which the plant is growing; and (ii) a probe configuration for applying a liquid below the surface of the soil proximate to the roots of the plant. The assembly is selectively reconfigurable by a user between the spray configuration and the probe configuration.

In one preferred form of the present invention, the liquid applied to the plant is water.

In another preferred form of the present invention, the liquid applied to the plant is fertilizer.

In still another preferred form of the present invention, the liquid applied to the plant is a pesticide or fungicide.

In accordance with another broad aspect of the present invention, an apparatus for applying a liquid to a plant includes a hollow conduit having a proximal end configured to be attached to a liquid supply source, and a distal end. The apparatus includes a hollow needle operatively connected at the distal end of the conduit, which defines a central axis. The needle includes at least one aperture therein extending radially relative to the central axis. The apparatus includes a cover having at least one axially-extending aperture therein. The cover is selectively movable to a spray configuration wherein at least a portion of the cover extends axially-outwardly of the needle to facilitate flow of a liquid from the proximal end of the conduit to the at least one axially-extending aperture in the cover. The cover is further selectively movable to a probe configuration wherein at least a portion of the needle extends axially-outwardly of (beyond) the distal end of the cover to expose the at least one aperture in the needle to facilitate flow of a liquid from the proximal end of the conduit to the at least one aperture in the needle.

In one form of the present invention, the needle has a plurality of apertures oriented approximately 90 degrees apart along a circumference of the needle for use in the probe configuration.

In another form of the present invention, the cover has a plurality of axially-extending apertures which are oriented in a circumferential pattern on a distal end surface of the cover for use in the spray configuration.

In one form of the present invention, the cover is slidably retractable toward the proximal end of the conduit in the probe configuration to expose the at least one aperture of the needle to a target region below the soil.

According to another aspect of the present invention, the cover functions as a slidable hand grip and has a flaring configuration in the direction away from the proximal end of the conduit.

In still another aspect of the present invention, the needle includes a plurality of radially-extending apertures which are spaced axially on the surface of the needle, along the central axis for dispersion of liquid at different depths.

In another form of the present invention, the cover includes a retention element, abutment surface, or boss for maintaining the cover in at least one of the spray or probe configurations.

In still another form of the present invention, the apparatus is combined with one of a trigger sprayer or fertilizer container operatively connected to the proximal end of the conduit.

In one aspect of the present invention, the needle extends at least six inches axially outwardly of the cover in the probe configuration.

According to yet another aspect of the present invention, the cover defines a first chamber and a second chamber, axially spaced from one another, the first chamber being fluidly connected to the conduit with the cover in the probe configuration, and the second chamber including at least one seal to substantially prevent flow of a liquid therethrough with the cover in the probe configuration.

In another broad form of the invention, a method of applying a liquid to a plant includes the steps of obtaining one of the aforementioned apparatus embodiments, moving the cover of the apparatus into the probe configuration, inserting the needle into soil in which a target plant is growing such that the needle is located proximate to the root structure of the plant, and introducing a flow of a liquid through the apparatus from the proximal end of the conduit and out of the at least one aperture in the needle.

Other features and advantages will become readily apparent from the accompanying drawings and the appended claims.

BRIEF DESCRIPTION OF THE DRAWINGS

In the accompanying drawings forming part of the specification, in which like numerals are employed to designate like parts throughout the same.

FIG. 6 shows the cover of the apparatus moved axially into the probe configuration to expose the needle;

DETAILED DESCRIPTION OF THE PREFERRED EMBODIMENTS

Figure 1:
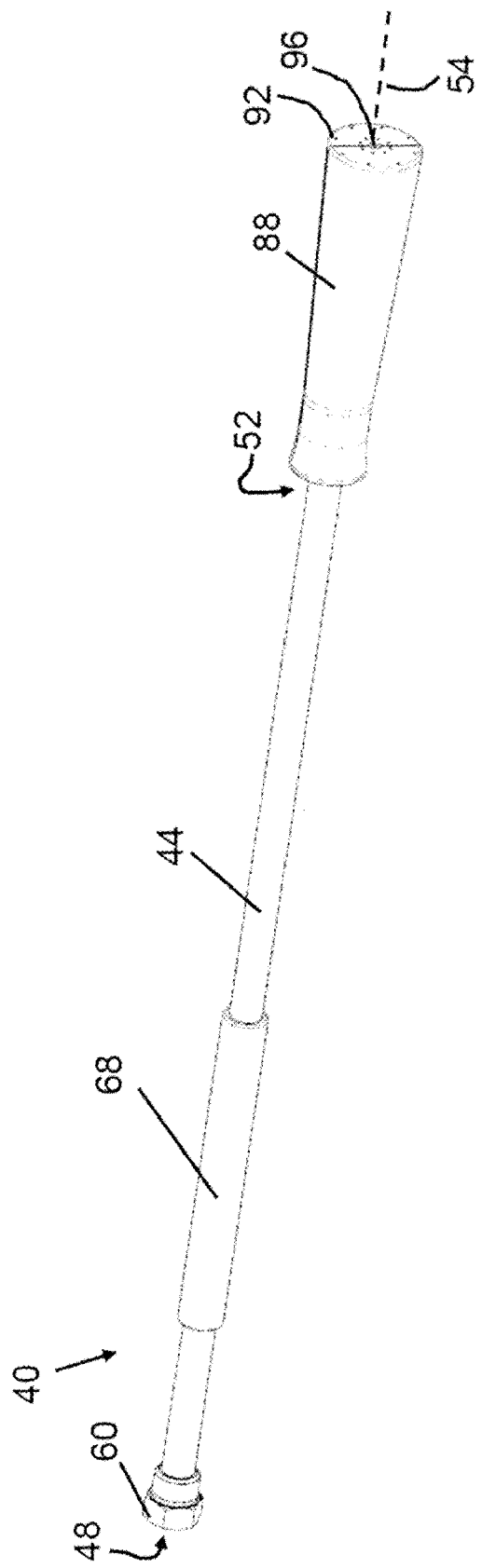
FIG. 1 is a greatly reduced-size, perspective view of an illustrated embodiment of a liquid application apparatus according to the present invention wherein the cover is illustrated in a spray configuration.
Figure 2:
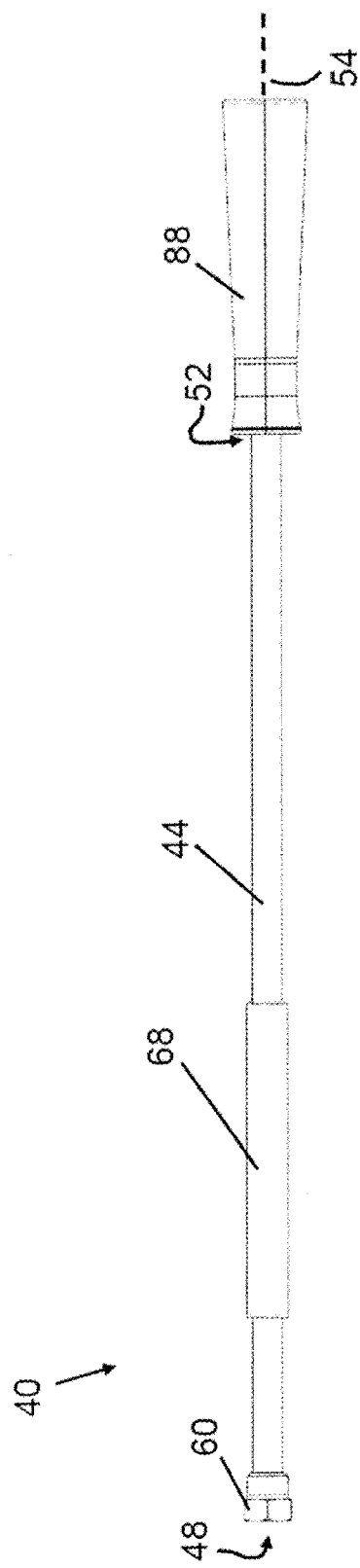
FIG. 2 is a is a side elevation view of the apparatus shown in FIG. 1.

While the present invention is susceptible of embodiment in various forms, there is shown in the drawings and will hereinafter be described the presently preferred embodiment, with the understanding that the present disclosure should be considered as an exemplification of the invention and is not intended to limit the invention to the specific embodiment illustrated.

In accordance with the illustrated preferred embodiment of the invention illustrated in FIGS. 1-13, the invention has the form of a handheld assembly or apparatus 40.

Figure 6:
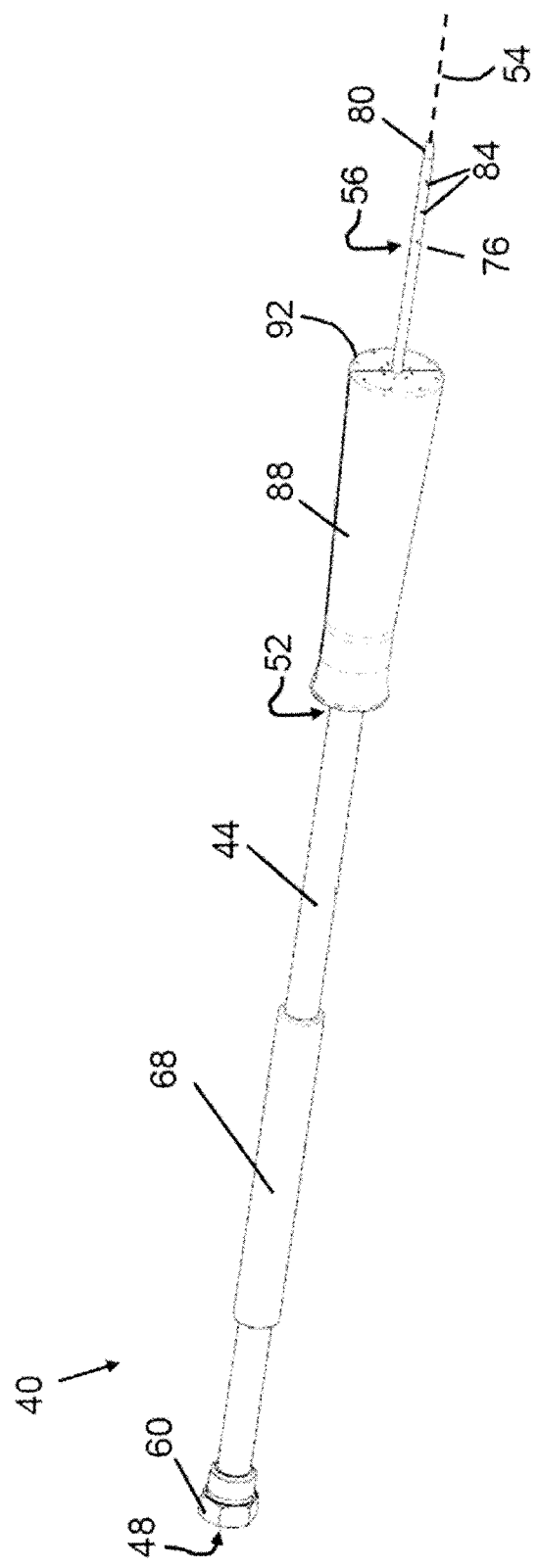
FIG. 6 is a perspective view of the apparatus of FIG. 1; however
Figure 7:
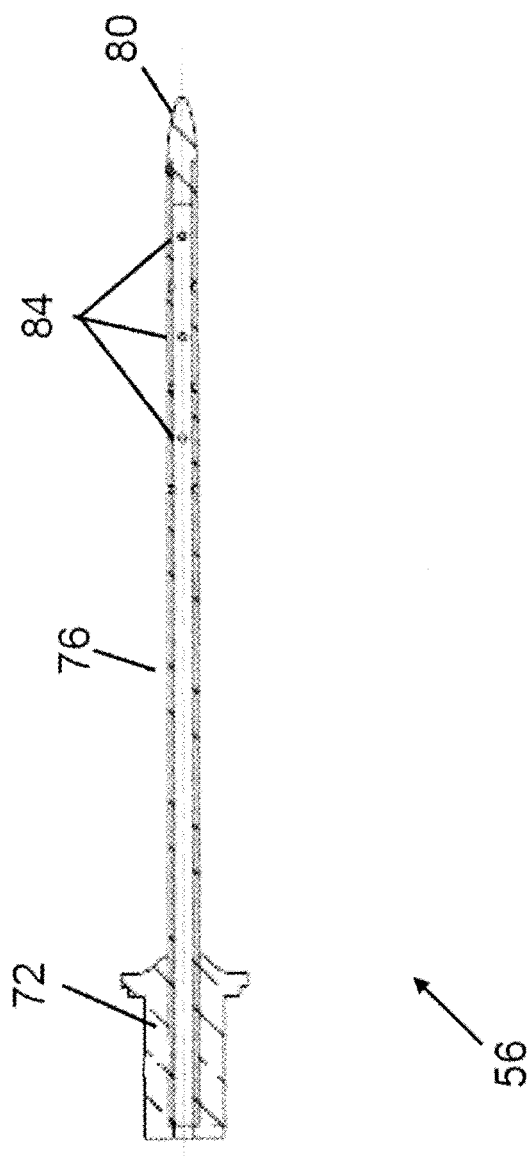
FIG. 7 is cross-sectional view of only the needle assembly or portion of the apparatus, taken along the central axis of the apparatus.
Figure 13:
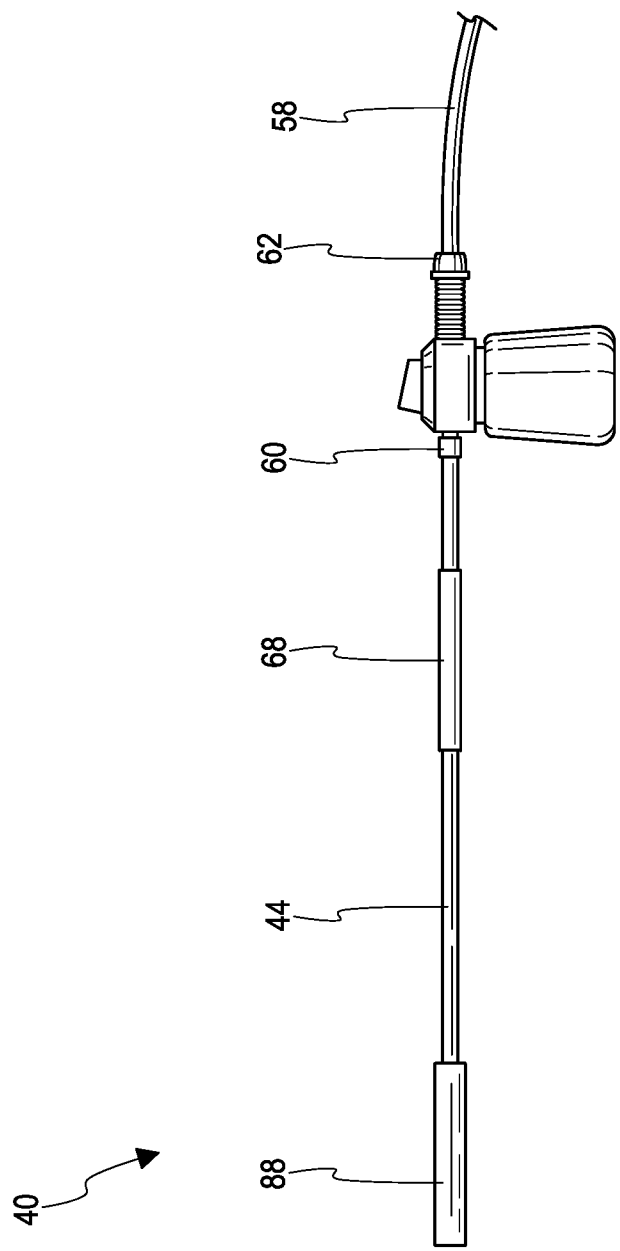
FIG. 13 is a diagrammatic view of the instrument shown in FIG. 1 connected to a fertilizer container and a fluid supply source.

With reference to FIG. 6, the apparatus 40 includes an elongate, hollow metal conduit 44 having a proximal end 48 and a distal end 52, and which defines a central axis 54 extending between the ends. The distal end 52 is connected to a probe or needle 56, which will be discussed in greater detail hereinafter. The proximal end 48 includes a means for fluidly connecting the conduit 44 to a liquid supply source such as a garden hose 58 (FIG. 13 only) or spigot (not illustrated). In the illustrated embodiment, the connection means has the form of a female screw thread attachment 60 that is press-fit onto the proximal end 48 of the conduit 44 and may receive a standard male screw thread hose fitting 62 (FIG. 13 only). It will be appreciated that other standard or non-standard connecting means may be employed, such as a quick release fitting, snap fittings, clamp, luer lock fitting, etc. Furthermore, the proximal end 48 may be incorporated into a larger assembly or machine, such as a wearable tank sprayer (not illustrated) or stationary machine (not illustrated).

Figure 5:
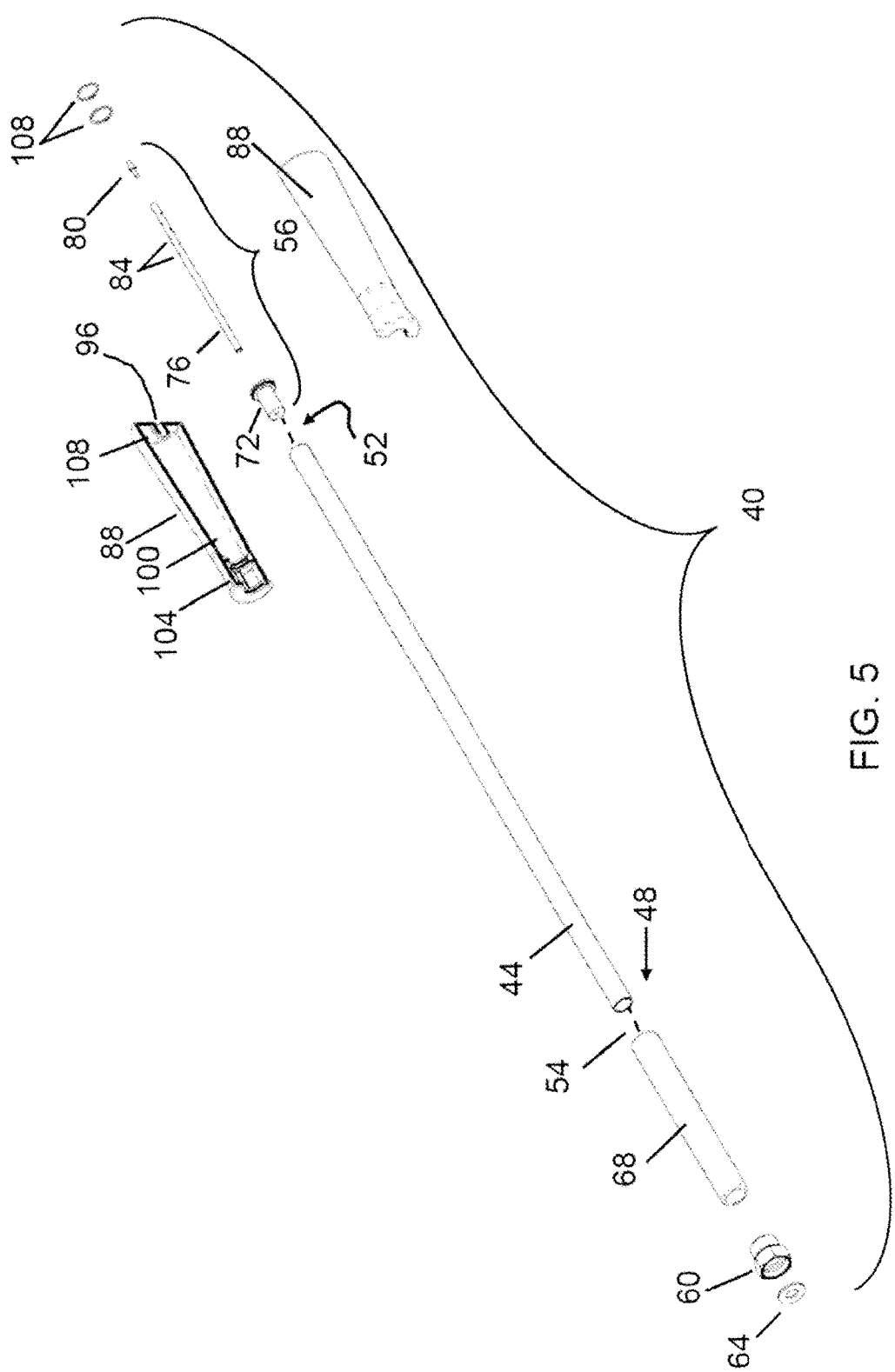
FIG. 5 is an exploded, perspective view of the apparatus shown in FIG. 1.

Referring now to FIG. 5, an O-ring or seal 64 is provided within the screw thread attachment 60 to provide a liquid-tight seal between the liquid supply source and the conduit 44.

Referring now to FIGS. 1 and 6, the apparatus 40 includes a hollow, cylindrical hand grip 68 fitted around the conduit 44 and located near the proximal end 48 thereof. The grip 68 is preferably formed from a foam material, and it may be frictionally fit around the outer surface of the metal conduit, or it may be adhesively fixed thereto.

Referring next to FIG. 5, the needle 56 in the illustrated embodiment of the apparatus 40 has the form of an assembly of smaller components. The needle assembly includes the following components: a hollow needle holder 72 press fit into the distal end 58 of the conduit 44; a hollow elongate needle body 76 that is press fit into the needle holder 72, and a solid needle tip 80 that is press fit into the needle body 76. Importantly, the needle body 76 includes a plurality of through holes or apertures 84 that extend radially from the central axis 54 to provided lateral spray from the needle 56 when the apparatus is in its probe configuration. Preferably, the needle body 76 includes three axially-spaced sets of four apertures 84, each aperture in a set being spaced 90 degrees apart from one another around the circumference of the needle body 76.

It will be appreciated that the needle 56 need not be formed as an assembly, and could be a unitary construction, or could be an assembly with a greater number of components or fewer components than the preferred embodiment of the invention illustrated herein. In addition, the needle body 76 could have a different arrangement or number of apertures 84 for some applications or uses of the apparatus 40, such as for different plant types having different root structures.

Figure 3:
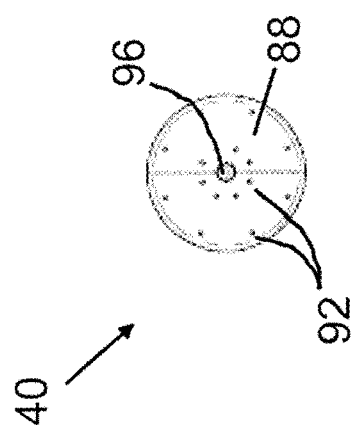
FIG. 3 is a front elevation view of the apparatus shown in FIG. 1.
Figure 4:
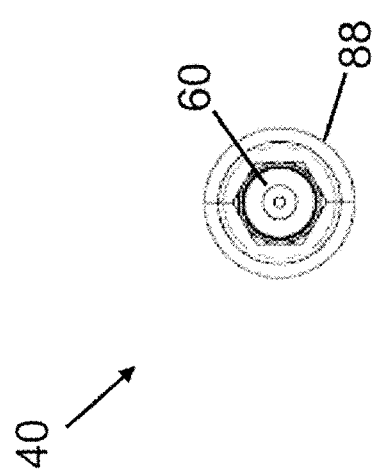
FIG. 4 is a rear elevation view of the apparatus shown in FIG. 1.

With reference now to FIGS. 1 and 6, the apparatus 40 includes a cover 88 that is movable relative to the conduit 44 and needle 56 in at least the axial direction (i.e., generally along the central axis 54) between: (i) a spray configuration (FIG. 1) wherein the cover 88 extends around and axially outwardly of the needle 56; and (ii) a probe configuration (FIG. 6) wherein some portion of the needle 56 extends axially outwardly of the cover 88. The cover 88 is generally flaring in shape in a distal direction along the axis 54 and is preferably formed from two plastic halves that are snapped together but could be glued or heat welded. The distal end of the cover 88 includes a plurality of axially-extending holes or apertures 92 arranged in two circumferential sets (as best seen in FIG. 3), for permitting flow of a liquid with the cover 88 in the spray configuration, as will be discussed in greater detail herein. The cover 88 further includes a central through hole 96 to accommodate movement of the needle 56 axially outwardly of the distal end of the cover 88 in the probe configuration.

Figure 8:
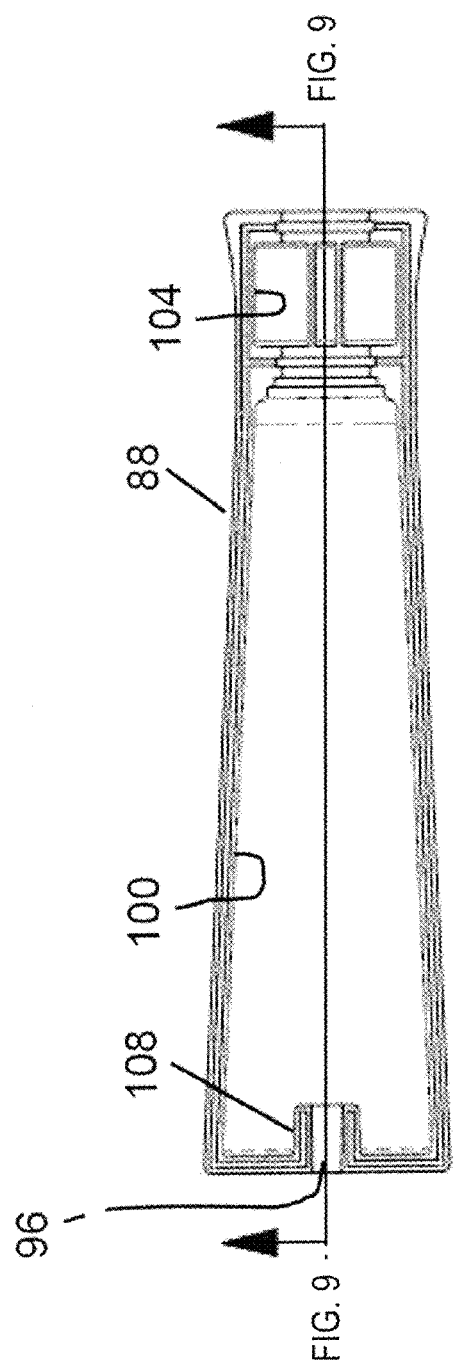
FIG. 8 is cross-sectional view of only the cover of the apparatus, taken along the central axis of the apparatus.
Figure 9:
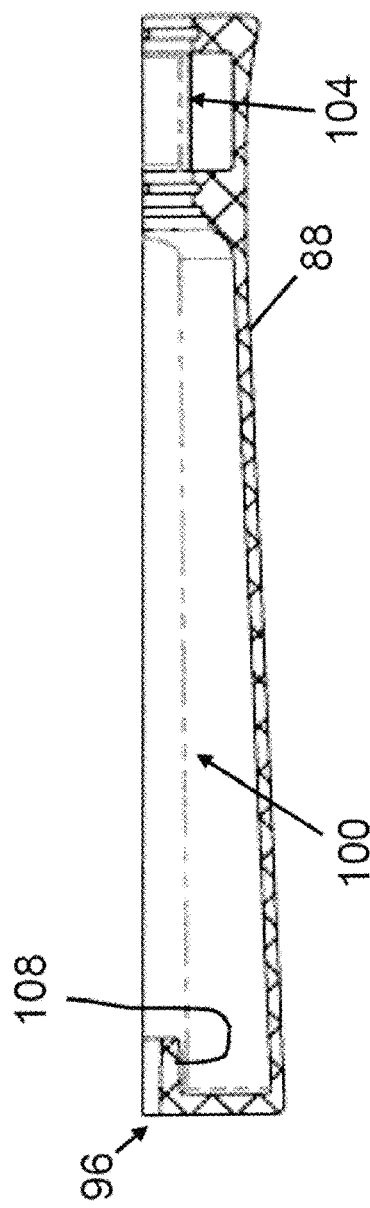
FIG. 9 is partial cross-sectional view, taken along the central axis of the apparatus, of only the cover of the apparatus.
Figure 10:
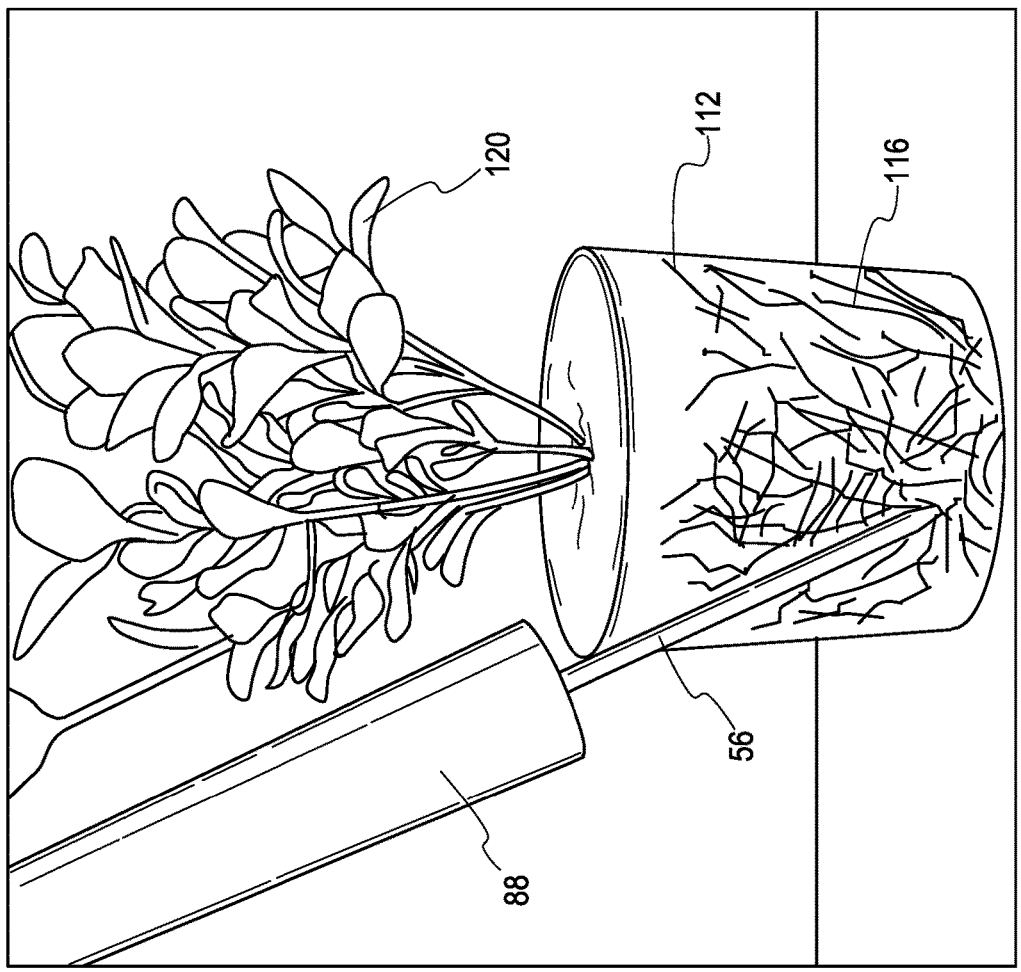
FIG. 10 is a diagrammatic view of the instrument shown in FIG. 1 in a probe configuration.
Figure 11:
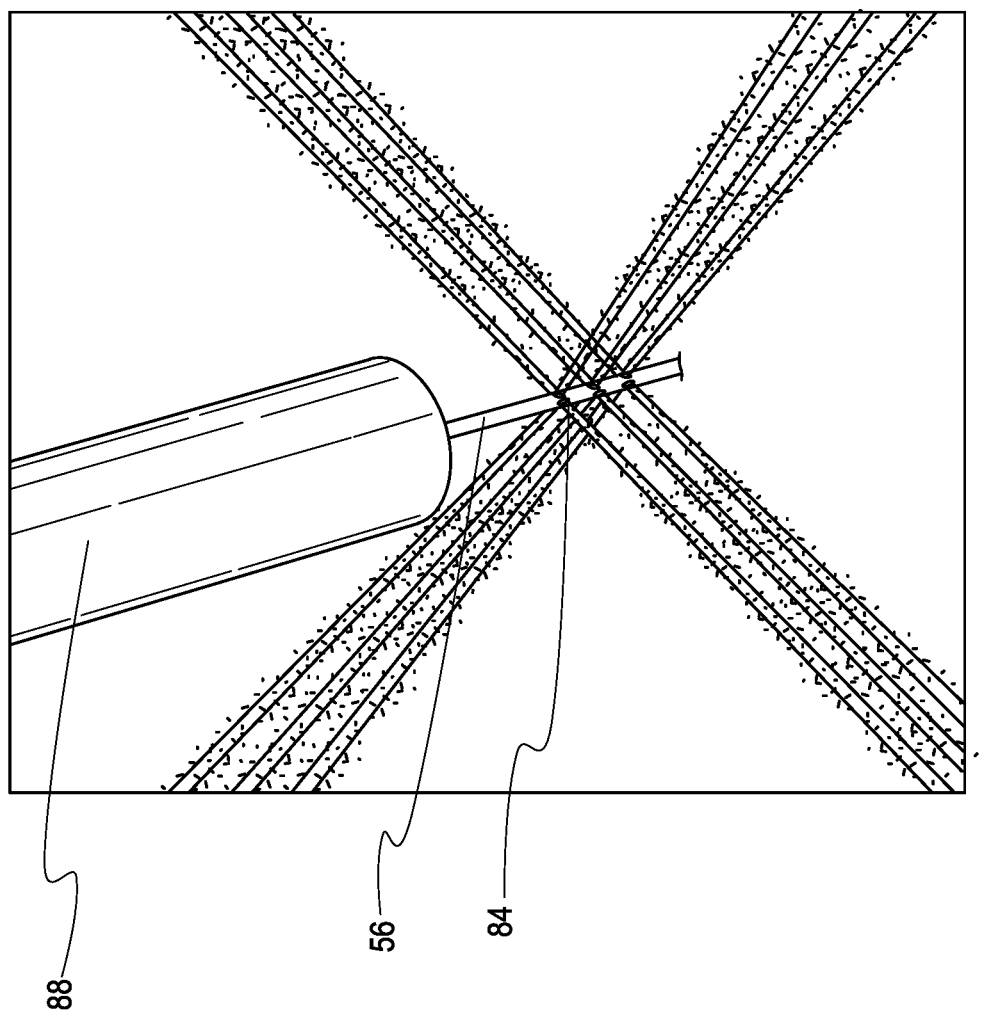
FIG. 11 is another diagrammatic view of the instrument shown in FIG. 1 in a probe configuration.
Figure 12:
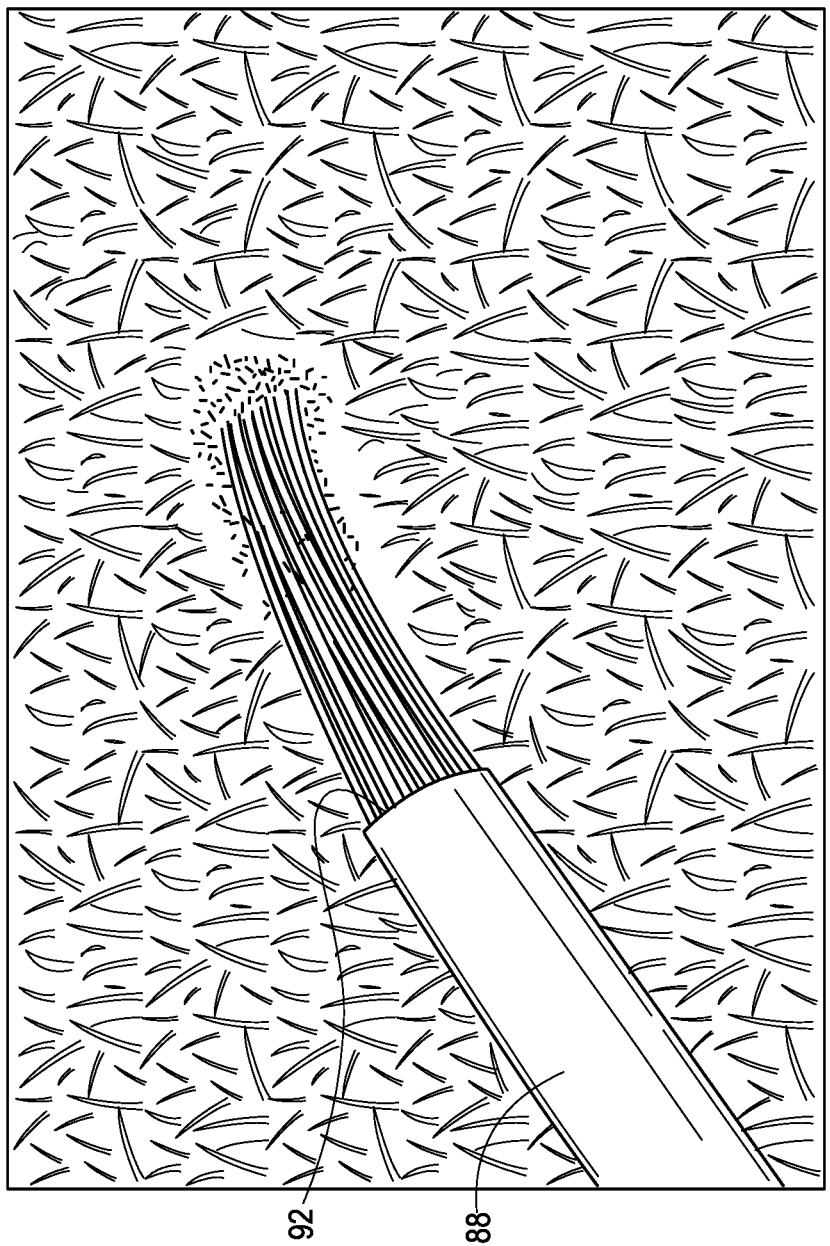
FIG. 12 is a diagrammatic view of the instrument shown in FIG. 1 in a spray configuration.

With reference to FIGS. 5 and 8, the cover 88 defines a first chamber 100 and a second chamber 104. The first chamber 100 functions to surround and protect the needle 56 when the cover 88 is in the spray configuration. In the spray configuration, a liquid flowing through the apparatus 40 exits the needle 56 and then flows out of the axially-extending apertures 92 in the cover 88. The second chamber 104 includes a pair of annular grooves to retain a pair of O-rings or seals 108 (FIG. 5) to prevent back flow of a liquid out of the cover 88 in a proximal direction (i.e., other than flow of a liquid out through the spray apertures 92) when the cover 88 is in the spray configuration. The cover 88 is movable in the axial direction relative to the needle 56 and the conduit 44 such that the needle holder 72 can abut the entrance to the second chamber 104 in the spray configuration, and the needle holder 72 can abut an internal boss 108 in the probe configuration.

It will be appreciated that the cover 88 could be movable relative to the needle 56 in a different manner than illustrated and could be screw threaded or have a ramming relationship with the conduit 44 which would permit the user of the apparatus 40 to reconfigure the cover 88 relative to the needle 56 between the spray and the probe configurations.

With reference to FIG. 10, the inventor has found that the apparatus 40 is able inject water directly below the surface of the soil 112 to reach the roots 116 of a target plant 120.

The apparatus 40 may be additionally be used for watering large areas of vegetation in the spray configuration (FIG. 12), where direct injection of water to the root system is not efficient such as in lawns of grass. Delivering water, nutrients, and/or treatments such as pesticides or fungicides directly to the root system by the apparatus 40 may have one or more of the following advantages: conservation of water; soil aeration, reduction of plant disease caused by direct application of liquid to the leaves of a plant; reduction of undesirable weed growth; and/or the promotion of deep root growth in the target plant. In the probe configuration, essentially all of the water is delivered by the apparatus 40 is available for absorption by the root system of the targeted plant and not subject to evaporation at the surface of the soil or absorption by shallow roots of fast-growing weeds. The pointed configuration of the needle 56 functions to loosen and aerate the soil in the probe configuration.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

The invention claimed is:

1. An apparatus for applying a liquid to a plant, the apparatus comprising:
   a. a hollow conduit having
      i. a proximal end configured to be attached to a liquid supply source, and
      ii. a distal end;
   b. a hollow needle operatively connected at the distal end of the conduit, the needle defining a central axis and having at least one aperture therein extending radially relative to the central axis; and
   c. a cover having at least one axially-extending aperture therein, the cover movable between
      i. a spray configuration wherein at least a portion of the cover extends axially-outwardly of the needle to facilitate flow of a liquid from the proximal end of the conduit to the at least one axially-extending aperture in the cover, and
      ii. a probe configuration wherein at least a portion of the needle extends axially-outwardly of the cover to expose the at least one aperture in the needle to facilitate flow of a liquid from the proximal end of the conduit to the at least one aperture in the needle; and wherein the cover includes a first chamber and a second chamber, the first chamber being fluidly connected to the conduit with the cover in the probe configuration, and the second chamber including at least one seal to substantially prevent flow of a liquid therethrough with the cover in the probe configuration.

2. The apparatus of claim 1 wherein the needle has a plurality of apertures oriented approximately 90 degrees apart along a circumference of the needle.

3. The apparatus of claim 1 wherein the cover has a plurality of axially-extending apertures oriented in a circumferential pattern on a distal end of the cover.

4. The apparatus of claim 1 wherein the cover is slidably retractable toward the proximal end of the conduit in the probe configuration to expose the at least one aperture of the needle.

5. The apparatus of claim 1 wherein the cover is a slidable hand grip having a flaring configuration in the direction away from the proximal end of the conduit.

6. The apparatus of claim 1 wherein the needle comprises a plurality of radially-extending apertures spaced axially along the central axis.

7. apparatus of claim 1 wherein the cover includes a retention element for maintaining the cover in at least one of the spray configuration and the probe configuration.

8. The apparatus of claim 1 in combination with a trigger sprayer operatively connected to the proximal end of the conduit.

9. The apparatus of claim 1 in combination with a fertilizer container operatively connected to the proximal end of the conduit.

10. The apparatus of claim 1 wherein the needle extends at least six inches axially outwardly of the cover in the probe configuration.

11. The apparatus of claim 1 wherein the cover includes an internal boss and the hollow needle includes a needle holder configured to permit the cover to move in an axial direction relative to the hollow needle such that the needle holder abuts the entrance to the second chamber in the spray configuration, and the needle holder abuts the internal boss in the probe configuration.

* * * * *